Ross & Graham,
Take Up Nut.
No. 109,348.   Patented Nov. 15, 1870.
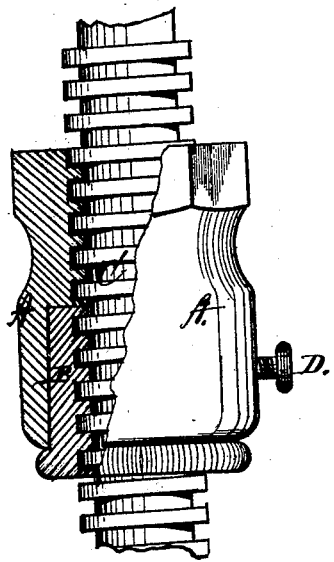
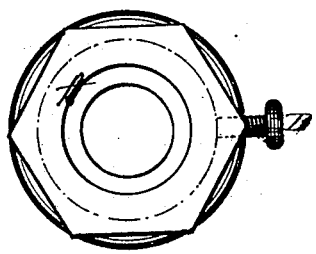
Witnesses
B. F. Woodruff
R. Barrett
Inventors
Thos. Ross
William W. Graham

United States Patent Office.

THOMAS ROSS AND WILLIAM W. GRAHAM, OF RUTLAND, VERMONT.

Letters Patent No. 109,348, dated November 15, 1870.

IMPROVEMENT IN TAKE-UP NUTS.

The Schedule referred to in these Letters Patent and making part of the same.

*To all whom it may concern:*

Be it known that we, THOMAS ROSS and WILLIAM W. GRAHAM, of Rutland, in the county of Rutland and State of Vermont, have invented certain new and useful Improvements in Take-up Nuts; and we do hereby declare that the following is a full, clear, and exact description thereof, reference being had to the accompanying drawing and to the letters of reference marked thereon, which form a part of this specification.

The nature of our invention consists in the construction of a "take-up nut," divided in two parts, and provided with means for securing the two parts upon and concentric with each other, as will be hereinafter fully set forth.

In order to enable others skilled in the art to which our invention appertains to make and use the same, we will now proceed to describe its construction and operation, referring to the annexed drawing, in which—

Figure 1 is a side view, part in section, and

Figure 2 is an end view.

Our take-up nut is composed of two pieces, A and B, placed on the screw C, the piece A overlapping the piece B, a recess being turned into the end of the part A to receive the part B.

By the part A overlapping the part B we are enabled to secure one to the other by a set-screw, D, after being screwed to a fit.

The parts A and B being screwed together to take up the loss motion caused by wear, the set-screw D is turned in to hold them both in any desired place, so that the nut will be tight or loose; or, in other words, when the nut is found to be loose, hold the part B and screw down the part A till there is no play, then tighten the set-screw D, which holds them firmly, making a perfect fit any time it is necessary.

This device is intended to be used where nuts are subject to wear, such as on the feed-screw on an ordinary iron-worker's lathe, and many other like places.

We do not confine ourselves to a set-screw as the means by which the two parts of the nut are secured together, as it may be done in various other ways, although the most preferable mode is, probably, by a set-screw.

Having thus fully described our invention,

What we claim as new, and desire to secure by Letters Patent, is—

A take-up nut, divided in two parts, and provided with suitable means for securing the two parts upon and concentric with each other, substantially as and for the purposes herein set forth.

In testimony that we claim the foregoing as our own, we affix our signatures in presence of two witnesses.

THOS. ROSS.
WILLIAM W. GRAHAM.

Witnesses:
R. BARRETT,
B. F. WOODRUFF.